C. A. CUTLER.
ANIMAL POKE.
APPLICATION FILED MAY 9, 1919.
1,349,324. Patented Aug. 10, 1920.
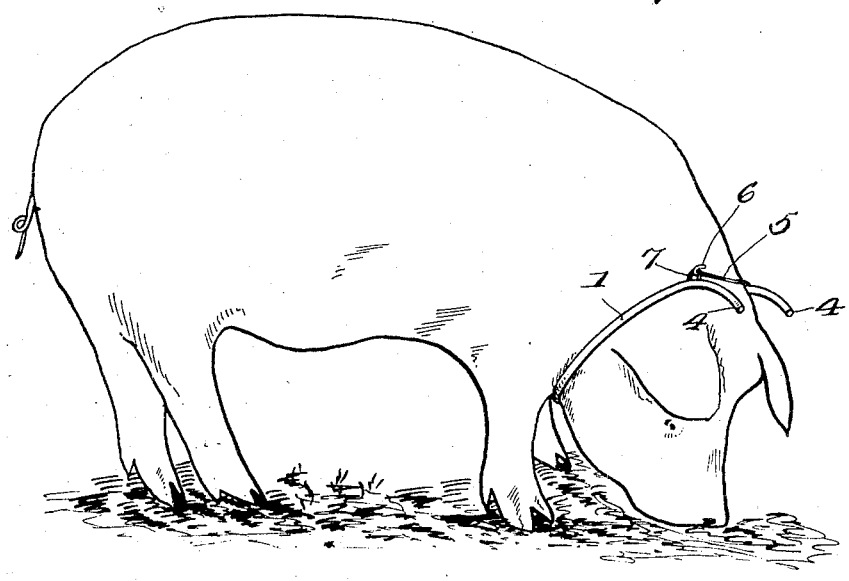
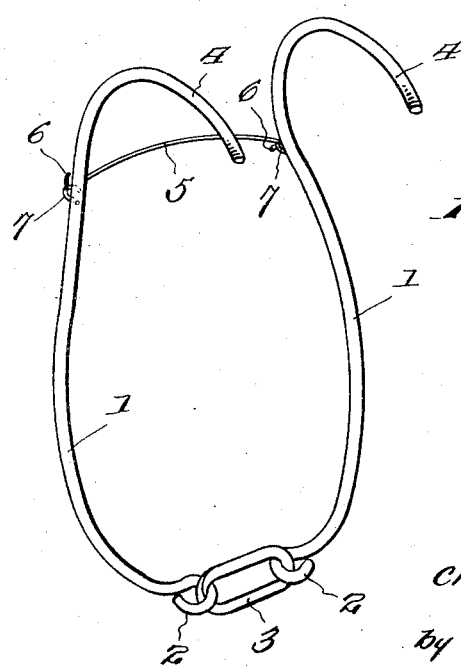
INVENTOR
Charles A. Cutler.
By Lacey & Lacey,
ATTYS.

UNITED STATES PATENT OFFICE.

CHARLES A. CUTLER, OF ADRIAN, MICHIGAN.

ANIMAL-POKE.

1,349,324.　　　　Specification of Letters Patent.　　Patented Aug. 10, 1920.

Application filed May 9, 1919. Serial No. 295,916.

*To all whom it may concern:*

Be it known that I, CHARLES A. CUTLER, a citizen of the United States, residing at Adrian, in the county of Lenawee and State of Michigan, have invented certain new and useful Improvements in Animal-Pokes, of which the following is a specification.

This invention seeks to provide a simple and cheap device which may be applied to small animals, more particularly hogs, and which when in use will be comfortable to the animal, but will be so constructed that should the animal attempt to pass under a fence or other obstruction the lower portion of the fence will be engaged and the device operated to pinch the animal's neck and thereby arrest his progress. The invention is illustrated in the accompanying drawings and consists in certain novel features which will be particularly pointed out in the claim following the detailed description.

In the drawings:

Figure 1 is a perspective view showing the device applied to an animal,

Fig. 2 is an enlarged perspective view of the device removed.

In carrying out my invention, I employ two side members 1 which are preferably constructed of light metallic rods and are so shaped in their lower portions that they will fit closely but easily around the neck of the animal, as indicated in Fig. 1. The lower extremities of these side members are formed into or provided with eyes 2 in which is engaged a connecting link 3 while the upper extremities of the side members are turned forwardly to provide hooks or arms 4 which will project sufficiently above the neck of the animal to engage over a fence wire or against such other obstruction as may be designed to retain the animal within a given space. To prevent accidental removal of the device from the neck of the animal, I employ a connecting member 5 which may be a light wire having its ends provided with hooks 6 to engage in staples or eyes 7 provided on the side members 1 near the upper ends thereof. The connecting member 5 should be of such length that it will hold the side members closely to the animal so that it cannot be easily slipped over the animal's head when he is feeding or at any other time. The device, however, will not interfere with the normal movements or activities of the animal, but should the upper hooks or forwardly projecting arms be engaged over a line wire or a fence or against some other obstruction, the device will be caused to rock upon the neck of the animal and the link 3 pushed against his throat so that the same will be pinched and cause the animal to back from the obstruction.

The device is exceedingly simple in its construction, will be very light in weight so that it will not be uncomfortable when applied, and may be produced at a very low cost. In practice, it will be found highly efficient for the purpose for which it is designed.

Having thus described the invention, what is claimed as new is:

An animal poke comprising rigid side members shaped to conform to the neck of an animal and having their lower portions bent inwardly to extend under the animal's neck and provided with horizontally disposed eyes at their extremities, the upper ends of said side members being formed into forwardly projecting arms, a single rigid substantially oval link loosely connecting said eyes and disposed at substantially right angles thereto, staples on the rear faces of the side members at the bases of the forwardly projecting arms, and a substantially straight connecting member formed of relatively light material having its ends provided with hooks loosely fitting within said staples and terminating thereat, said hooks being constantly out of contact with the animal's neck.

In testimony whereof I affix my signature.

CHARLES A. CUTLER. [L. S.]